Dec. 15, 1936.  W. D. CARR ET AL  2,064,460
BATTERY AND GENERATOR INDICATOR
Filed Jan. 16, 1933   2 Sheets-Sheet 1
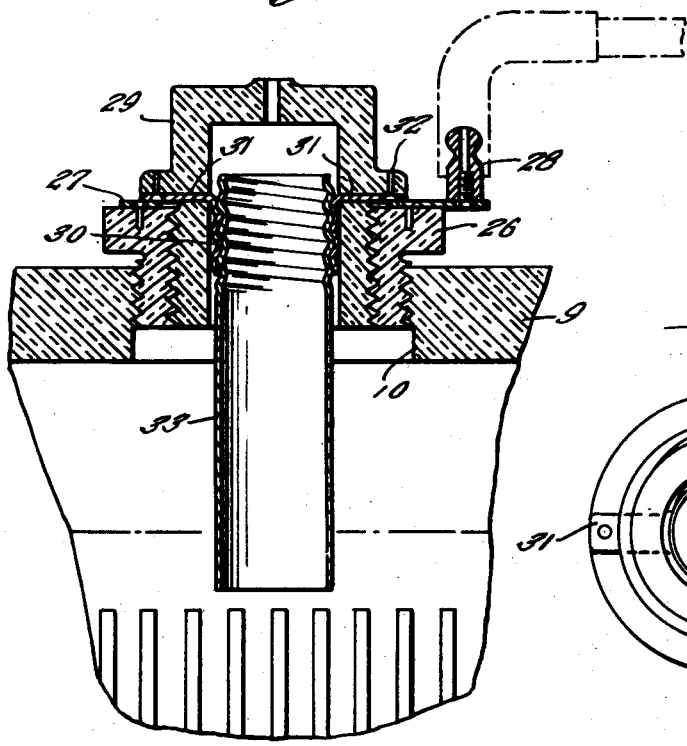
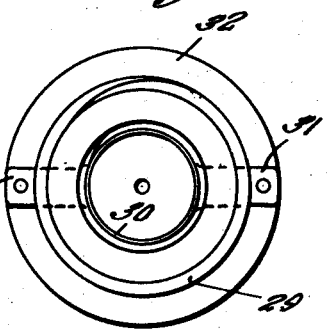
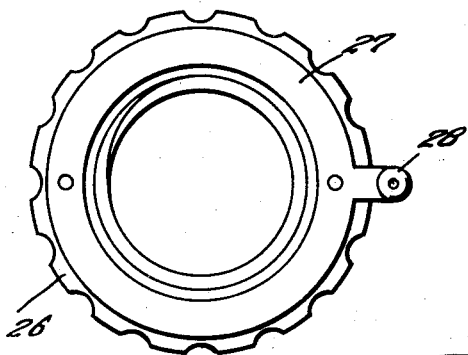
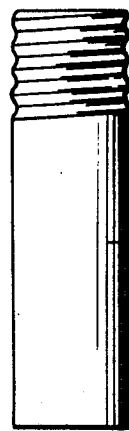
Inventors
Wayne D. Carr
Henry L. Shirey
By Clarence A. O'Brien
Attorney Dec. 15, 1936.  W. D. CARR ET AL  2,064,460
BATTERY AND GENERATOR INDICATOR
Filed Jan. 16, 1933  2 Sheets-Sheet 2
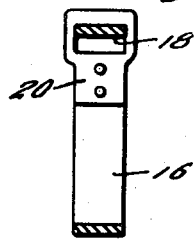
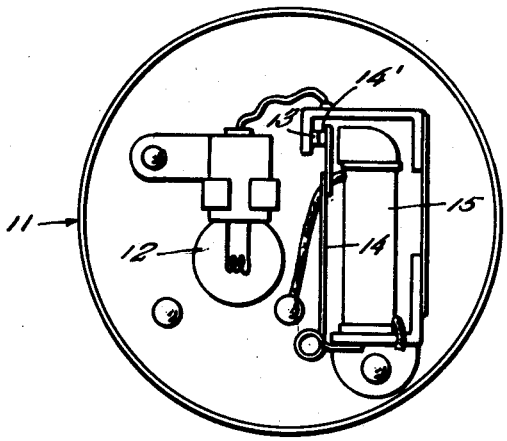
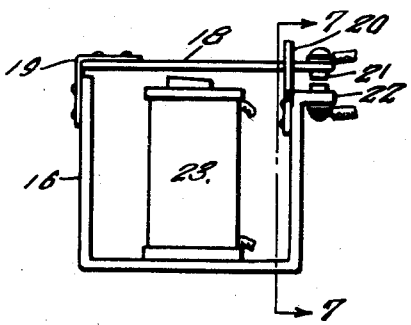
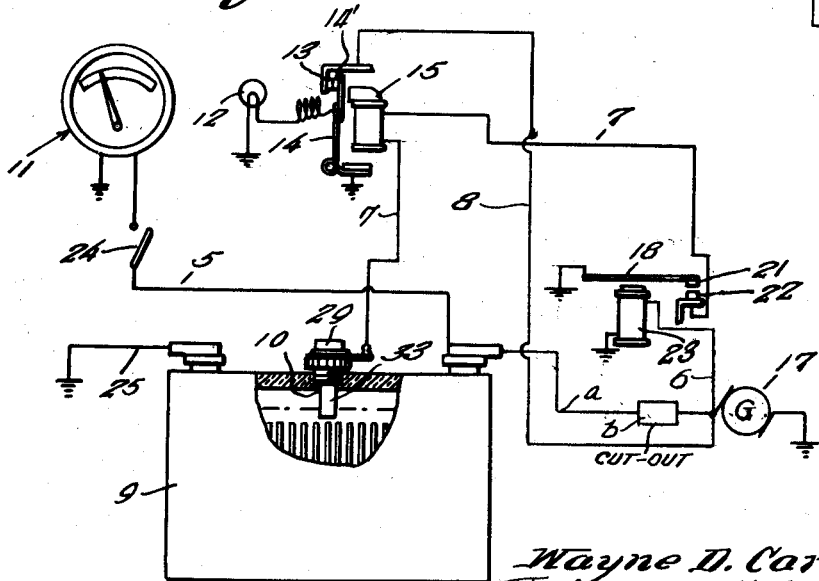
Inventors
Wayne D. Carr
Henry E. Shirey
By Clarence A. O'Brien
Attorney Patented Dec. 15, 1936

2,064,460

UNITED STATES PATENT OFFICE 2,064,460

BATTERY AND GENERATOR INDICATOR

Wayne D. Carr and Henry E. Shirey,
Pinckney, Mich.

Application January 16, 1933, Serial No. 652,058

3 Claims. (Cl. 177—311)

This invention relates to battery and generator indicators, especially designed to indicate the electrolytic level in the battery and to show the charging-current conditions in the generator.

It is a principal object of this invention to provide an electrical system to indicate the electrolytic level in a storage battery used on motor vehicles by a proper signal means which will place a minimum burden upon the system.

It is a further object of this invention to provide an electrical indicating system, which through the medium of a sensory signal means will indicate whether or not the electrolytic level in a storage battery has receded to a dangerous point, and show the condition of the brushes of the generator used in the charging circuit of the same system.

Other objects of this invention will be apparent in the description following and in the appended claims, reference being made to the accompanying drawings forming a part of this specification wherein like reference characters designate like parts in the several views.

Fig. 1 is a cross-sectional view of the upper part of a storage battery showing the positioning of an electrode therein, which will make electrical contact with the electrolyte under proper conditions.

Fig. 2 is a plan view of a cap used in positioning the electrode.

Fig. 3 is a bottom plan view of a removable plug adapted to be associated with the cap.

Fig. 4 is an elevational view of the electrode.

Fig. 5 is an elevational view of a volt meter casing showing a desirable method of association with a signal element.

Fig. 6 is an elevational view of an electromagnetically controlled relay or switch of a type desirable to use with the invention.

Fig. 7 is a sectional view taken substantially on the line 7—7 of Fig. 6.

Fig. 8 is a diagrammatic illustration of a method in which the invention may be utilized.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology and/or terminology employed herein is for the purpose of description and not of limitation, and it is not intended to limit the invention claimed herein beyond the requirements of the prior art.

Referring to the drawings, our system is shown in diagram in Fig. 8, in which the electrical relations between the parts are clearly illustrated.

Our invention may be applied with advantage to the electrical system of an automobile, which is shown as part of our system as illustrated in Fig. 8. The electrical system of an automobile includes a storage battery 9, in a grounded circuit with a cut-out b and a generator 17. Under normal running conditions of the automobile, the generator 17 creates a voltage which places an electrical charge in the storage battery 9. When the generator voltage is lower than that of the storage battery, discharge of the storage battery through the generator is prevented by the interposition of the cut-out b, which opens the circuit under these conditions. The electrical relations of the parts in this circuit are well known and need not be described further.

A voltmeter 11 and circuit 5 controlled by switch 24 may be provided to indicate the voltage of the battery. An ammeter may also be used by placing the same in series with the charging circuit, the ammeter showing the charging rate. As shown in Fig. 8 the voltmeter is connected in parallel with the generator and will read the generated voltage of the generator.

It is in a system of this type that our invention can be used to good advantage as to give further information about the charging relations between the generator and the battery, and to show whether or not the electrolyte in the battery is at a proper level.

To provide an apparatus to indicate a dangerously low electrolytic level in the battery, we have positioned an electrode 33 of inert material, such as lead or the like, in the cap of a cell of the battery. It is of such length that it extends downwardly into the electrolyte of the cell well below the normal level thereof, being designed to break electrical contact when the electrolyte level has receded to a dangerous point where the plates of the cell are liable to become injured. A construction of any suitable type which will attain this purpose will be properly employed, as for example the electrode shown in Fig. 1.

In the construction shown in Fig. 1, the cap 26 is provided with a threaded aperture with which is engaged the externally threaded portion of a socket-equipped plug 29 of insulating material. Arranged in the socket 29 is a threaded sleeve 30 of suitable conductive material and is provided at its upper end with oppositely extending arms 31 extending through radial apertures provided in the plug 29 and riveted or otherwise secured at their outer ends to a shoulder 32 provided externally of the plug 29. The arms 31 rest on the ring 27 as shown. The electrode member 33 consists of a tube of suitable conductive material, and at its upper end is threaded, being engaged with threads in the sleeve 30. The function of this electrode member 33 has been previously described.

A proper signal means, as for example a small light bulb 12, is provided so that the operator will have some sensory means located on the dash board or any other convenient place on his automobile whereby he may recognize the proper functioning of the system. To control the action of this signal means, we have provided two relays, one of which has normally-closed contacts and the other normally-open contacts. These relays are well known in the art and may be of any suitable design to function within the characteristics of the electrical system of the automobile to which our invention is attached, as for example the relays shown in Figs. 5, 6, and 7.

The signal means 12 and the two relays are placed in circuit with the electrical system of an automobile, (already described) as shown in Fig. 8. The diagram of connections may be analyzed in circuit groupings as follows: First the signal circuit, which comprises a grounded circuit including the signal means 12, the electrical contacts 13 and 14' of the normally-closed switch, and the generator; second the electrode circuit, which comprises a grounded circuit including the electrical contacts 21 and 22 of the normally-open switch, the actuating electromagnet 15 of the normally-closed switch, an electrolytic path through the battery; and third the control circuit, which comprises a grounded circuit including the actuating electromagnet 23 of the normally-open switch and the generator 17.

The operation of our system is as follows: Assuming that the motor is not operating as the starting point of the cycle of operation of the invention, at this point the switches or relays are in their normal positions and the battery has no current demands, as the normally-open switch and the cut-out prevent any flow and completely isolate the battery. Assuming now that the motor has been started, the generator will create a voltage which will energize the signal means 12 and the coil 23 on the normally-open switch, and when the voltage is sufficient, the switch will be actuated by the coil 23 by moving the armature 18, which will close the contacts 21 and 22. In the meantime while the generator has been building up voltage, the signal lamp has been indicating this voltage by a slowly brightening glow. Assuming that the electrolytic path through the battery is complete by having the electrolyte at its normal level, at which time the electrode positioned in the battery cell is in contact therewith, thereafter magnet 15 will be actuated. The armature 14 may have an adjustment in connection therewith to allow control of the actuating voltage, and when this voltage is attained the contact points 13 and 14' will be opened. In opening these contacts the signal circuit is broken and the signal lamp will immediately darken.

This cycle clearly indicates the following conditions: If, when the motor is started the signal lamp slowly brightens up and is then extinguished, it indicates that both the generator and the electrolyte level are normal and that no attention of the operator is necessary; but if the signal lamp fails to follow this cycle, the operator will know that either the electrolyte level in he battery cell is low or that the generator is inoperative. By means of his voltmeter he can immediately ascertain the charging voltage of the generator and estimate whether or not this is normal. If the charging voltage is normal, by elimination of this fault he will be able to deduce that the electrolyte level is dangerously low and needs attention.

During the early stages of the operating cycle while the generator is building up voltage to operate the relays, the glow of the lamp is a good indicator of the condition of the brushes in the generator. If the contact made by the brushes on the generator commutator is poor, it will be shown in the signal lamp by flickering, or by complete darkness if the contact is broken altogether. By complete darkness, we mean that the lamp will not be lighted at any time during the cycle, and is not to be confused with the volitional darkness of the signal after the relays have operated and broken the signal circuit.

In this way, we have provided an electrical system which will indicate whether or not the electrolyte in a battery cell is at a proper level, and at the same time indicate the fitness of the brushes in the generator and the operative conditions thereof.

Having thus described our invention, what we claim as new is:

1. In the electrical system of an automobile, the combination of a battery circuit comprising a battery, a generator and a cut-out, a signal means actuated by the generator, and an electrical control means including an electrolytic path through the battery when the electrolyte is substantially at its normal level and relay devices, whereby the signal means is cut off from the generator at a predetermined voltage if the electrolytic path is intact.

2. In an apparatus for determining the electrolytic level of a battery and the commutation efficiency of a generator in circuit with the battery, the combination of an electrode inserted in the electrolyte of the battery approximately at the normal level thereof, a signal element in circuit with the generator, an electromagnet in circuit with the electrode, a switch in the signal circuit controlled by the magnet to open the signal circuit upon closing of the magnet circuit, an electromagnet in circuit with the generator, and a switch in the electrode circuit controlled by the magnet in the generator circuit, for closing the electrode circuit when the generator circuit is energized.

3. In a battery charging circuit, comprising a battery, a generator, and a cutout; a signal circuit, including a signal means, a normally-closed electromagnetic switch and the generator; a control circuit, including an electrolytic path through the battery when the electrolyte is substantially at normal level, the generator, the electromagnet controlling the switch in the signal circuit, and a normally-open electromagnetic switch; and an actuating circuit, including electromagnet controlling the normally-open switch in parallel with the generator.

WAYNE D. CARR.
HENRY E. SHIREY.